United States Patent
Sosseh et al.

(10) Patent No.: US 7,460,329 B2
(45) Date of Patent: Dec. 2, 2008

(54) FEEDFORWARD COMPENSATOR FOR INDUCED VIBRATION

(75) Inventors: Raye Abdoulie Sosseh, Minneapolis, MN (US); John C. Morris, Eden Prairie, MN (US)

(73) Assignee: Seagate Technology LLC, Scotts Valley, CA (US)

(*) Notice: Subject to any disclaimer, the term of this patent is extended or adjusted under 35 U.S.C. 154(b) by 170 days.

(21) Appl. No.: 11/586,202

(22) Filed: Oct. 25, 2006

(65) Prior Publication Data

US 2008/0100953 A1 May 1, 2008

(51) Int. Cl.
*G11B 5/596* (2006.01)
(52) U.S. Cl. .................................. 360/78.04
(58) Field of Classification Search .......... 360/78.04, 360/75, 78.09, 77.02, 78.14, 78.05; 361/146; 702/109; 417/363
See application file for complete search history.

(56) References Cited

U.S. PATENT DOCUMENTS

| | | | |
|---|---|---|---|
| 5,999,361 A * | 12/1999 | Kim | 360/78.09 |
| 6,462,927 B2 * | 10/2002 | Swinbanks | 361/146 |
| 6,560,059 B1 | 5/2003 | Hsin et al. | 360/78.04 |
| 6,690,534 B2 | 2/2004 | Ding et al. | 360/77.02 |
| 6,751,047 B2 | 6/2004 | Bonin et al. | 360/78.06 |
| 6,816,800 B2 * | 11/2004 | Heiland | 702/109 |
| 6,888,694 B2 * | 5/2005 | Guo et al. | 360/77.03 |
| 6,950,274 B2 * | 9/2005 | Inaji et al. | 360/78.14 |
| 7,031,099 B2 * | 4/2006 | Kohso et al. | 360/78.05 |
| 7,307,262 B2 * | 12/2007 | Van Dijsseldonk et al. | 250/492.1 |
| 2005/0046994 A1 | 3/2005 | Hanson et al. | 360/77.04 |
| 2005/0106043 A1 * | 5/2005 | Casaro et al. | 417/363 |

* cited by examiner

*Primary Examiner*—Fred Tzeng
(74) *Attorney, Agent, or Firm*—Westman, Champlin & Kelly, P.A.

(57) ABSTRACT

A feedforward compensator for induced vibration is disclosed. Controlled motions in an actuator induce mechanical disturbances in a surrounding cabinet. The feedforward compensator allows such disturbances to be compensated for without the need of a vibration sensor. The compensator provides a feedforward compensation signal configured to compensate for a mechanical disturbance predicted to be induced by a controlled motion of the actuator, and applies the feedforward compensation signal to a signal that controls the motion of the actuator.

19 Claims, 4 Drawing Sheets

FEEDFORWARD COMPENSATOR FOR INDUCED VIBRATION

FIELD

The present disclosure relates generally to actuator systems, and more particularly to methods and devices for compensating for induced vibrations in actuator systems, such as those used in data storage devices.

BACKGROUND

Actuators and their associated servo control loops are used in a variety of different applications. As these applications continue to become more sophisticated, there is a desire to increase the performance characteristics of the actuators.

For example, data storage systems have tended to be made ever smaller, yet with ever greater storage capacity, as technology has advanced. Such data storage systems are usefully applied in a wide variety of settings including computers, networks, digital music players, PDAs, digital still cameras and video cameras, and external computer memory, among a wide variety of other possible examples. In one illustrative data storage system, for example, data is written onto and read from a medium by a transducer mounted on a slider. The slider is suspended from a suspension coupled to an actuator arm that is rotatably mounted on a base and driven by a voice coil motor. The actuator arm positions the transducer relative to a data track on the medium, responsively to a seek command.

There remains a persistent need for providing actuators in data storage systems and other applications with increasingly superior performance characteristics, including by reducing size, raising storage capacity per unit of size, and raising the speed with which the actuator operates. One limit on the performance of a data storage system is the accuracy with which the system can evaluate and control the position of the read/write head or other form of transducer to the positions of data within the system. The better performance characteristics of data storage systems have involved an ever shrinking gap between adjacent data tracks on a storage medium, and ever increasing servo open loop bandwidth for controlling the position of a read/write head relative to the data tracks. One impediment to further improvements in data storage system performance is the mechanical vibrations caused by the servo-controlled actuator arm as it is rotated to position the transducer to desired positions. Testing has shown such seek-induced vibrations to be a major factor limiting the performance of data storage systems.

One or more embodiments of the present disclosure provide solutions to these and other problems, and offer other advantages over the prior art.

SUMMARY

One or more embodiments of the present disclosure provide unforeseen and inventive advantages over conventional data storage systems, including by assuring superior control of a read/write head or other transducer, relative to a data storage medium, as an illustrative example.

One illustrative embodiment of the present disclosure pertains to a method that includes providing a feedforward compensation signal configured to compensate for a mechanical disturbance predicted to be induced by a controlled motion of an actuator, and applying the feedforward compensation signal to a signal that controls motion of the actuator.

Another illustrative embodiment of the present disclosure pertains to an apparatus that includes a servo controller and a compensator. The servo controller includes a position input relating to a position of an actuator and a control signal output for controlling the position of the actuator. The compensator includes a position input, a feedforward current input, and a modified feedforward current output. The compensator is configured to modify the feedforward current to compensate for a predicted vibration induced by a controlled motion of the actuator. The modified feedforward current output and the control signal output are communicatively connected to provide a combined compensated control signal in communicative connection with a control input for an actuator.

Another illustrative embodiment of the present disclosure pertains to an apparatus configured to provide a feedforward current to a control signal for a servo-controlled mechanism in a data storage system, such that the feedforward current compensates, independently of a vibration sensor, for a vibration induced by the servo-controlled mechanism.

Other features and benefits that characterize embodiments of the present disclosure will be apparent upon reading the following detailed description and review of the associated drawings.

DETAILED DESCRIPTION OF ILLUSTRATIVE EMBODIMENTS

Embodiments of the present disclosure provide unforeseen and inventive advantages over conventional actuator systems, such as by compensating for induced vibrations in an actuator system. A seek operation performed to position the transducer may also induce a mechanical vibration in the data storage system. One way to compensate for such induced vibrations has included a sensor to read the vibrations so that they may be compensated. In an illustrative embodiment, an algorithm is used to provide a predicted mechanical disturbance induced by a controlled motion of an actuator arm, and a feedforward compensation signal configured to compensate for the predicted mechanical disturbance is generated and applied to a signal that controls the actuator arm. The data storage system thereby compensates for induced mechanical disturbances independently of a vibration sensor, so that such a sensor is not needed. The cost and weight of the data storage system may thereby be reduced, among other advantages.

Some examples of inventive actuator systems are described herein as illustrative embodiments, although the inventive subject matter extends more broadly than any single example. Certain underlying aspects of basic engineering and of positioning technologies that are known in the art are omitted for brevity.

Figure 1:
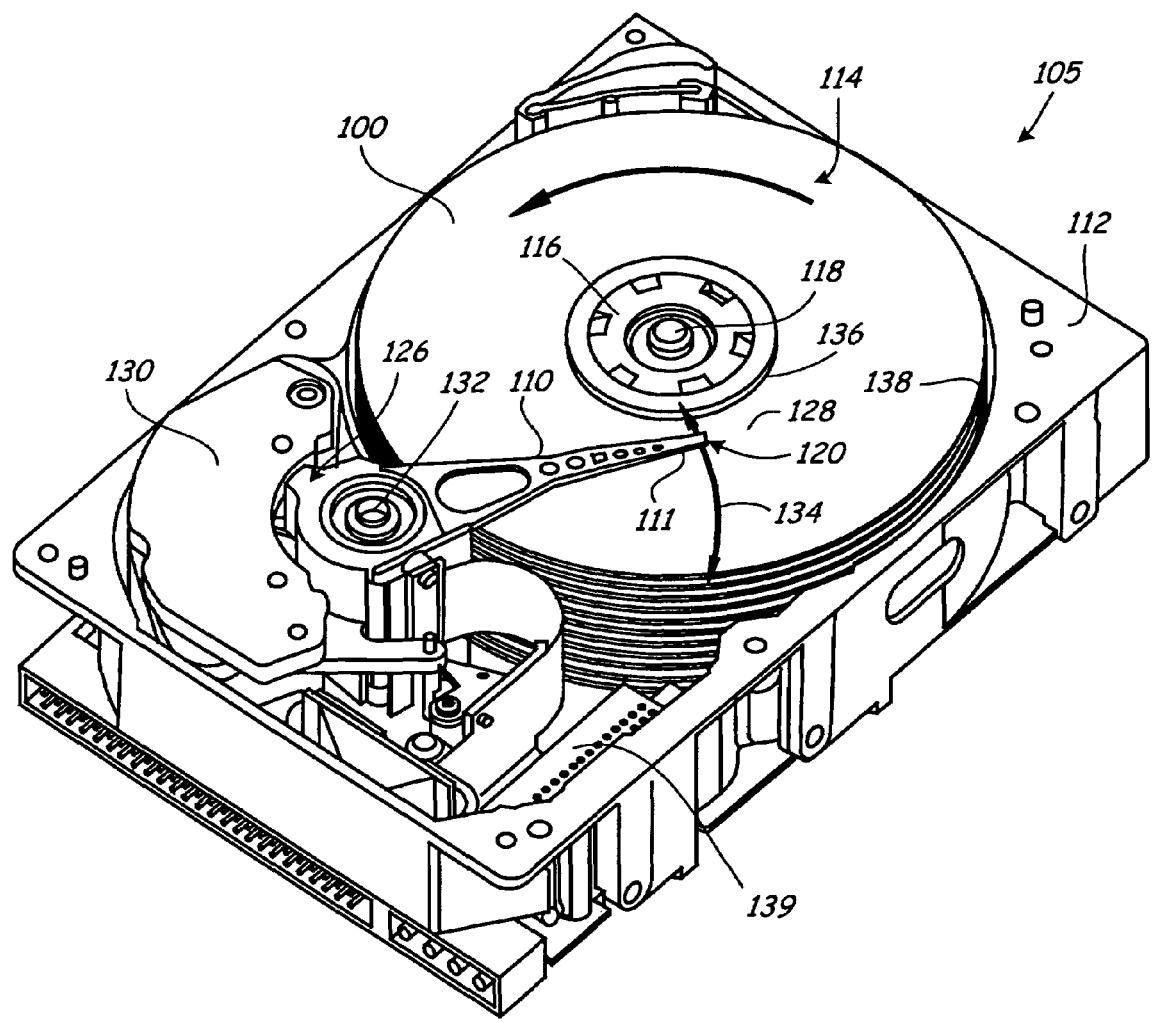
FIG. 1 is a perspective view of a data storage system, according to one illustrative embodiment.

FIG. 1 depicts data storage system 105 in one illustrative embodiment comprising a disc drive, which may incorporate a controller or other device with a fractional position algorithm, according to one illustrative embodiment. FIG. 1 depicts an exploded, perspective view of a data storage system 105, illustratively embodied as a disc drive in this embodiment, which includes disc 100, according to an illustrative embodiment.

Data storage system 105 is one example from a variety of data storage systems and other types of data storage systems to which various embodiments are applicable. Data storage system 105 includes a housing with a deck 112 and a top cover (not shown). Data storage system 105 also includes a disc pack 114 comprising representative disc 100 and several other, similar discs. Disc pack 114 is rotatably mounted on deck 112 on a spindle motor (not shown) by a disc clamp 116. Disc pack 114 includes a plurality of individual discs which are mounted for co-rotation about central axis 118. Each disc surface has an associated slider, such as representative slider 120, which is mounted to disc drive 105 and carries a data interface head such as a read/write head or other form of transducer (not separately shown), with read and/or write function, on slider 120 for communication with the respective disc surface, such as representative disc surface 128, in this illustrative embodiment. The transducer on slider 120 is capable of reading data from and writing data to disc surface 128, in this illustrative embodiment. The data is generally written along a series of concentric or spiral data tracks written on media surface 128, for example. The transducers may be of any type known in the art or yet to be developed, including magnetic, magnetoresistive, giant magnetoresistive (GMR), optical, and so forth, in various embodiments. In different embodiments, a wide variety of numbers of discs, read/write heads, and head-bearing sliders, may occur.

In FIG. 1, representative slider 120 is supported by a suspension 111 mounted on actuator arm 110, which is rotatably mounted on deck 112. More particularly, actuator arm 110 is rotatably mounted on actuator 126, included on deck 112, and is thereby disposed on deck 112 in a controllably moveable way. Suspension 111 supplies a pre-load force to slider 120 which is substantially normal to opposing disc surface 128. The pre-load force counteracts a fluid dynamic lifting force developed between slider 120 and disc surface 128 during the rotation of disc pack 114. Each disc surface is likewise interfaced by a similarly disposed slider (not shown). Actuator 126 is a rotary moving coil actuator and includes a voice coil motor, shown generally at 130, in this illustrative embodiment. Voice coil motor 130 rotates actuator 126 about pivot shaft 132 to position slider 120 over an intended data track (not shown in FIG. 1) along a slider range 134 between a disc inner diameter 136 and a disc outer diameter 138. Other elements may occur in alternative embodiments, such as an actuator that positions the transducer through linear extension and retraction, for example.

Voice coil motor 130 operates under the control of controller 139. Controller 139 may include internal circuitry, software, and/or firmware for controlling the operation of data storage system 105, for example. Such software or firmware may include computer-executable instructions included on a computer-readable medium, along with a processor configured to execute those instructions. The computer-executable instructions may also configure the processor to perform further tasks, such as receive position information, produce evaluated values based on that information such as a predicted position of a transducer, and send control instructions based on those evaluated values, for example.

Controller 139 may govern both a data flow to and/or from the disc surfaces via the transducers, and a servo control loop for accurately positioning the transducers relative to the disc surfaces, according to this illustrative embodiment. Controller 139 may implement algorithms for reading and writing data from and to the media surfaces such as representative media surface 128, and for functions involved in supporting such reading and writing of data, such as controllably positioning the transducers relative to the media surfaces, and relative to tracks on the media surfaces, in an illustrative embodiment. Controller 139 may also comprise one or more filters configured to support the monitoring and control of the data storage system, for example.

Figure 2:
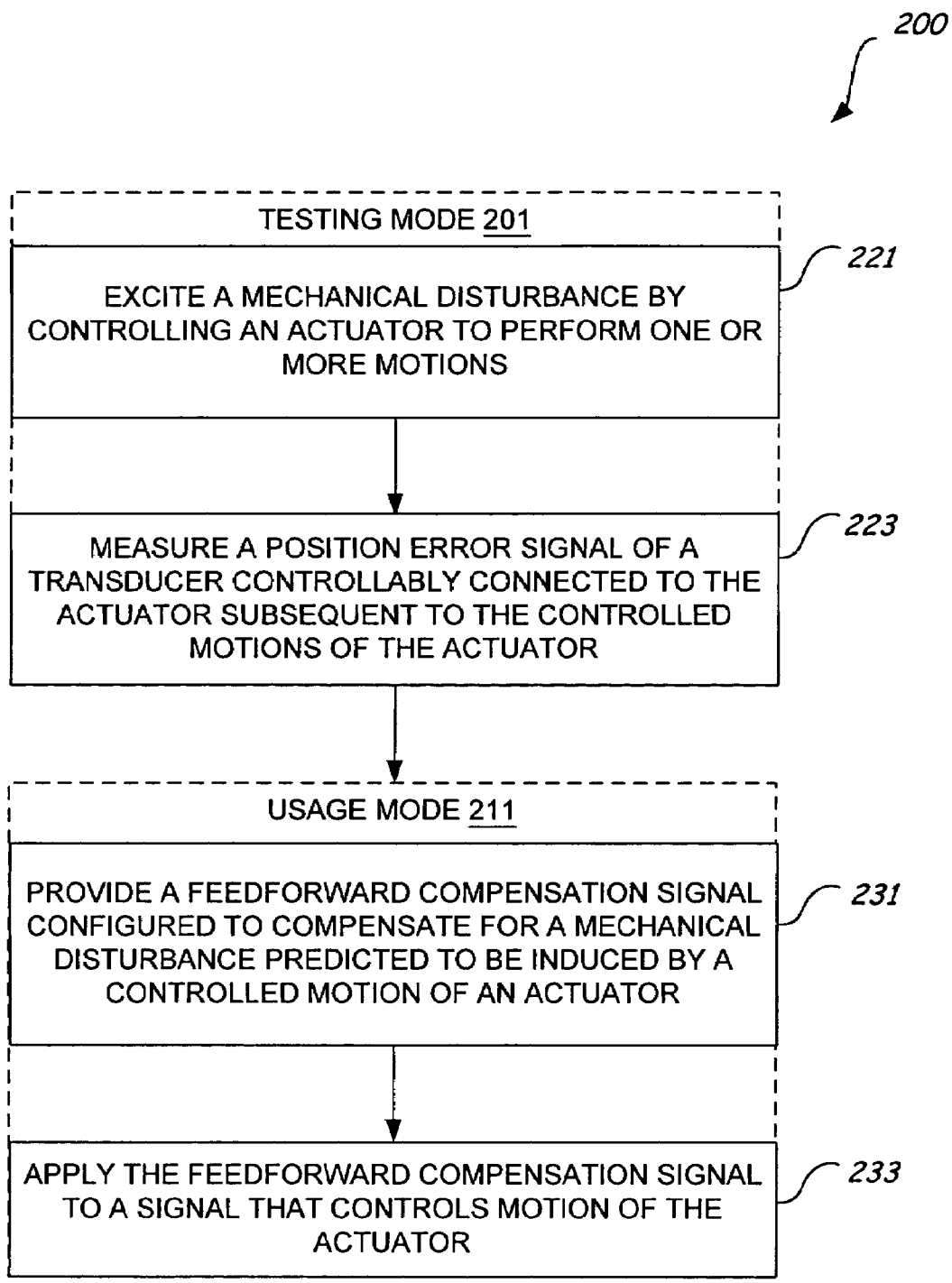
FIG. 2 depicts a flowchart for a method according to another illustrative embodiment.

FIG. 2 depicts a flowchart block diagram of a method 200 of compensating for mechanical disturbances, according to one illustrative embodiment. Method 200 includes both a testing mode 201, for learning mechanical disturbances caused by controlled motions of an actuator, and a subsequent usage mode 211 for normal usage, that compensates for mechanical disturbances as predicted based on the results of the testing mode 201, according to the illustrative embodiment of FIG. 2.

Testing mode 201 includes step 221, to excite a mechanical disturbance by controlling an actuator to perform one or more motions, and step 223, to measure a position error signal of a transducer controllably connected to the actuator subsequent to the controlled motions of the actuator. Usage mode 211 includes step 231, to provide a feedforward compensation signal configured to compensate for a mechanical disturbance predicted to be induced by a controlled motion of an actuator, and step 233, to apply the feedforward compensation signal to a signal that controls the motion of the actuator, according to the illustrative embodiment of FIG. 2. These steps are further elaborated below, with reference to FIG. 3.

Figure 3:
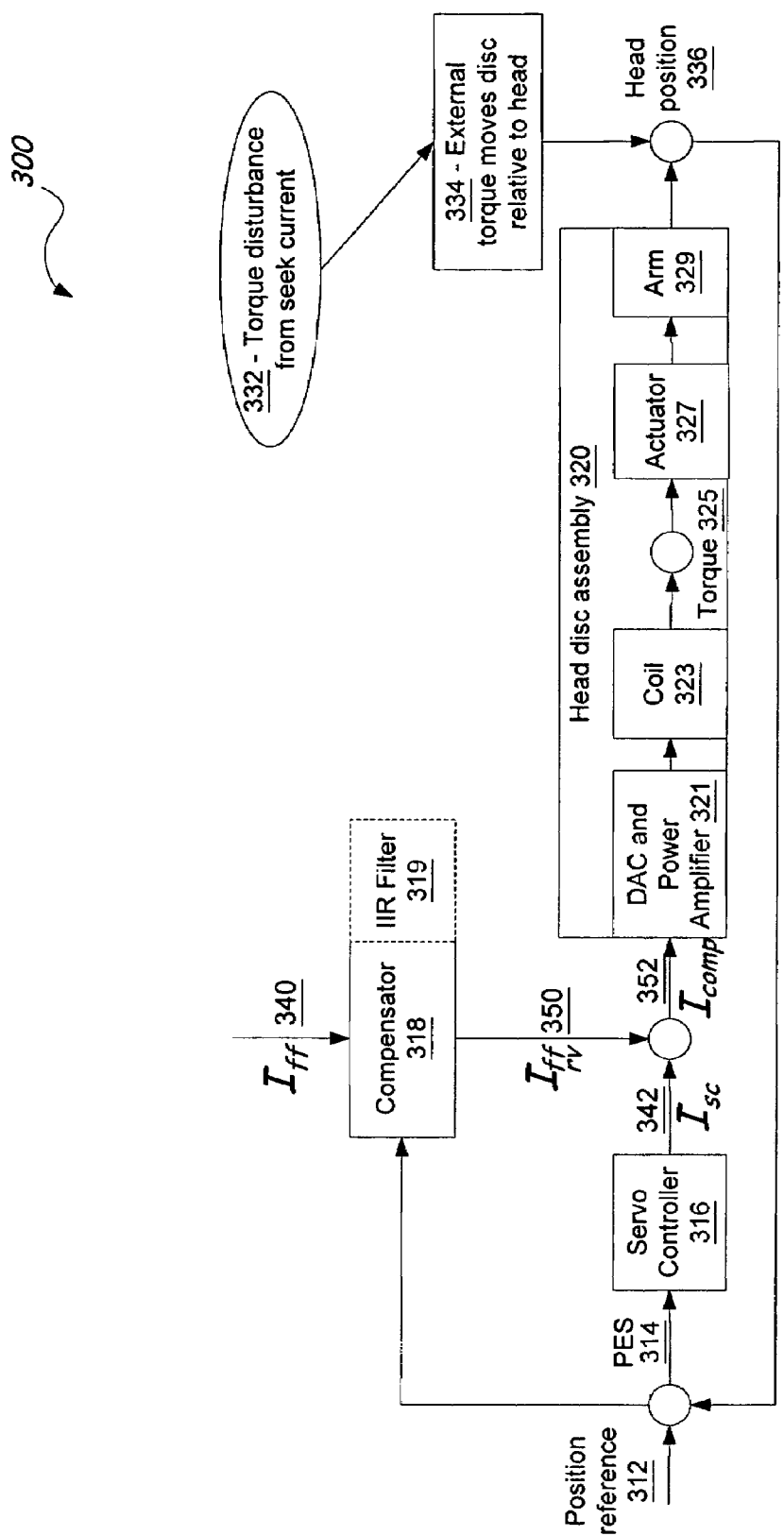
FIG. 3 depicts a block diagram of model for the control of a transducer of the data storage system, according to one illustrative embodiment.

FIG. 3 depicts a block diagram of a feedforward loop 300 for monitoring and control of data storage system 105, according to one illustrative embodiment. In other embodiments, feedforward loop 300 can be implemented in any other type of apparatus having an actuator that has a controlled position and controlled-motion-induced mechanical disturbances. According to the schematic depiction of feedforward loop 300, a transducer position reference 312 and a transducer position reading 336 are used to provide a position error signal (PES) 314. Position error signal 314 is used by servo controller 316 to generate a servo control signal ($I_{sc}$) 342. Transducer position reference 312 and transducer position reading 336 are also used by compensator 318 to predict a mechanical disturbance induced by a controlled motion of actuator 327, such as the motion of a track seeking operation. Compensator 318 uses this prediction to determine a feedforward compensation component configured to compensate for the mechanical disturbance. Compensator 318 receives the raw feedforward current ($I_{ff}$) 340 from a feedforward current source, and applies the feedforward compensation component to the raw feedforward current ($I_{ff}$) 340 to provide feedforward compensation signal ($I_{ffw}$) 350, which is configured to compensate for the mechanical disturbance predicted to be induced by the controlled motion of the actuator.

Compensator 318 may use an algorithm, a filter, or other means to provide the feedforward compensation signal 350, in various embodiments. For example, compensator 318 incorporates an infinite impulse response (IIR) filter 319 in the illustrative embodiment of FIG. 3.

In particular, IIR filter 319 may have a transfer function that characterizes the cabinet dynamics as a function of the seek current frequency, one or more natural frequencies of the cabinet dynamics, and one or more damping ratios of the cabinet dynamics. The transfer function may constitute a Laplace transform of the impulse response of the IIR filter. In the present illustrative embodiment, the cabinet dynamics transfer function (cabTf) of the IIR filter 319 may be provided as follows, where s represents the seek current frequency, $\omega_n$ represents the natural frequency, and $\xi$ represents the damping function:

$$cabTf = dc \frac{s^2}{s^2 + 2\xi\varpi_n s + \varpi_n^2}$$

The transfer function provides a basis for providing a seek current frequency s as a function of the natural frequency $\omega_n$ and damping function $\xi$ that characterize the vibrational/mechanical disturbances due to the cabinet dynamics which are to be compensated for. In other embodiments, for example, multiple natural frequencies and/or multiple damping ratios may be searched for and estimated, where the combination of one or more natural frequencies and one or more damping ratios may be modeled over more than two axes, requiring correspondingly more involved computation.

The filter may be implemented digitally, in this illustrative embodiment, wherein the seek current frequency is implemented as a Fourier transform of a discretized time-domain sampling rate, which coincides with or is an integer multiple of the seek sampling rate of the data storage system. A range of both candidate natural frequency values and candidate damping function values may be applied and tested in the testing/learning mode. A natural frequency or a damping function, or a combination of the two, that provide the best feedforward compensation, as observed for example in the power measured in a position error signal due to the mechanical vibrations, may be saved and applied to compensation signals in normal usage. In this case, the position disturbing effects of the actual mechanical vibrations and disturbances due to characteristic responses of the cabinet dynamics to induced motions during usage are to a substantial degree predicted and canceled out by the feedforward compensation signal that is designed around the natural frequency and damping function that characterize the cabinet dynamics, and that is applied to the signal that controls the motion of the actuator.

In particular, during normal operation, after predictive values have been produced by a learning mode, rotational vibration feedforward compensation signal 350 is applied to servo control signal 342, to form a compensating servo control signal ($I_{comp}$) 352, which controls the motion of actuator arm 110 in a way that compensates for the predicted mechanical disturbances induced by controlled motions such as seek operations. The use of compensator 318 to generate a feedforward signal based on characteristics learned during a training mode thereby enables the feedforward compensation signal to be provided independently of a vibration sensor, or of a feedback signal representing ongoing conditions, in this illustrative embodiment.

The compensating servo control signal 352 is received by head disc assembly 320, which includes digital/analog converter and power amplifier 321, coil 323, actuator 327, and actuator arm 329. Coil 323 applies torque 325 to actuator 327: The controlled motion of the transducer head resulting from the output from head disc assembly 320, along with torque 334 that moves the disc relative to the transducer head, due to a torque disturbance 332 from the seek current, determine the transducer head position 336 relative to the disc. The resulting actual position of the transducer head can be detected in a variety of ways in different embodiments, such as through position signals read from the disc surface, a position sensor, or any other position detecting methods or apparatus. The transducer head position 336, along with transducer position reference 312, provide the position error signal (PES) 314 and an input for compensator 318, in the illustrative embodiment of FIG. 3.

Returning to the learning mode, the algorithm for predicting the mechanical disturbances of induced motions may include a self-tuning mechanism that includes controlling the actuator to perform one or more toggle seek operations of different lengths with dwell, which excite rotational vibrations in the cabinet in which the data storage system is housed, and evaluating induced vibrations relative to the cabinet. This may include evaluating induced vibrations relative to a particular slot in the cabinet in which the data storage system is disposed. Evaluating induced vibrations may include measuring the power spectral distribution induced by the rotational vibration in the position signal returned by the transducer, as an indicator of the severity of the mechanical disturbance. In particular, the algorithm may identify the amplitude of the dominant peak in the frequency of the power spectral distribution, as a specific indicator of mechanical disturbance to be minimized.

Figure 4:
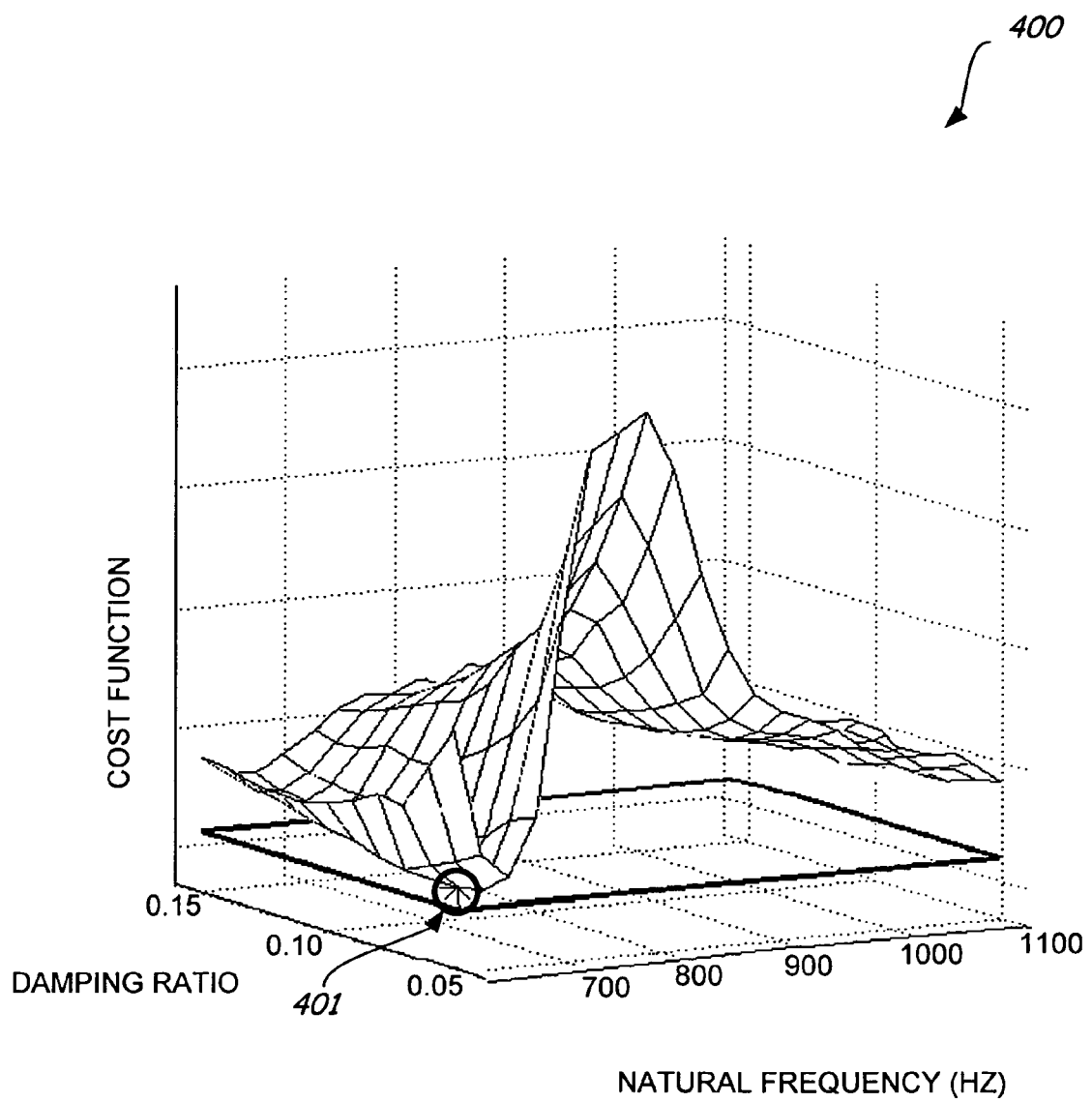
FIG. 4 illustrates a graph of measured values indicating precision of actuator control from a cabinet dynamics predictive learning mode, to enable predicting a mechanical disturbance induced by a controlled motion of an actuator and providing a feedforward compensation signal configured to compensate for the mechanical disturbance, according to one illustrative embodiment.

FIG. 4 illustrates a graph 400 of measured values from a learning mode, representing the two inputs of natural frequency on one axis and damping ratio on another axis, with the resulting, observed cost function on the third axis. The cost function is a measure of the mechanical disturbances that interfere with performance of an actuator-driven component, in terms of effects such as erroneous read or write positioning with an actuator-driven transducer, with a low cost function correlating with high actuator precision and performance. The measured values of cost function as a function of various values of both natural frequency and damping ratio, from a testing mode with a data storage system, are plotted in a manifold. As is apparent, the cost function varied considerably over relatively short differences in input values. A minimum cost function was also identified in this test, indicated at 401, which occurred with a natural frequency of about 750 hertz and a damping ratio of about 0.07, for the particular data storage system tested. Given such results from this testing mode, such a data storage system could then store these particular values in its compensator, or have a compensator incorporating such values added to it. During normal usage, this compensator could then provide a feedforward compensation signal corresponding to a natural frequency of 750 hertz and a damping ratio of about 0.07, thereby being configured to compensate for a mechanical disturbance predicted to be induced by a controlled motion of this particular actuator as indicated in testing mode. The compensator would then apply this feedforward compensation signal to the signal that controls motion of the actuator.

Various embodiments therefore include unexpected and novel advantages as detailed herein and as can be further appreciated from the claims, figures, and description by those skilled in the art. Although certain embodiments are described in reference to a disc drive or a data storage system, various other embodiments have application to other types of actuator systems and to other types of systems where a need is found to compensate for induced mechanical disturbances, or to evaluate the power spectral distribution in a servo control signal.

It is to be understood that even though numerous characteristics and advantages of various illustrative embodiments have been set forth in the foregoing description, together with details of the structure and function of various embodiments, these examples are illustrative only; changes may be made in detail, especially in matters of structure and arrangement of parts within the principles of the present disclosure, to the full extent indicated by the broad, general meaning of the terms in which the appended claims are expressed. It will be appreciated by those skilled in the art that the teachings of the present disclosure can be applied to a family of systems, devices, means, and applications encompassed by and equivalent to the examples of embodiments described, without departing from the scope and spirit of the present disclosure.

What is claimed is:

1. A method comprising:
   providing a feedforward compensation signal configured to compensate for a mechanical disturbance predicted to be induced by a controlled motion of an actuator;
   applying the feedforward compensation signal to a signal that controls motion of the actuator; and
   using a testing mode to predict the mechanical disturbance predicted to be induced by the controlled motion of the actuator prior to providing a feedforward compensation signal, wherein the testing mode comprises exciting a mechanical disturbance by controlling the actuator to perform one or more motions, and measuring a position error signal of a transducer controllably connected to the actuator subsequent to the controlled motions of the actuator.

2. The method of claim 1, wherein measuring the mechanical disturbance induced by the motions comprises measuring a power spectral distribution of the position error signal.

3. The method of claim 1, wherein the testing mode comprises searching for one or more natural frequencies associated with the position error signal having a reduced power.

4. The method of claim 1, wherein the testing mode comprises searching for one or more damping ratios associated with the position error signal having a reduced power.

5. The method of claim 1, wherein the actuator is disposed in a cabinet, and wherein the testing mode comprises evaluating induced vibrations relative to the cabinet.

6. The method of claim 1, wherein the testing mode comprises searching though a range of natural frequencies and damping ratios to determine a combination of natural frequency and damping ratio that reduce power measured in the position error signal.

7. A method comprising:
   predicting a mechanical disturbance to be induced by a controlled motion of an actuator independently of a vibration sensor;
   providing a feedforward compensation signal configured to compensate for the mechanical disturbance predicted to be induced by the controlled motion of the actuator; and
   applying the feedforward compensation signal to a signal that controls motion of the actuator.

8. The method of claim 7, wherein the signal that controls the motion of the actuator comprises a servo control signal.

9. The method of claim 7, further comprising using an algorithm to predict the predicted mechanical disturbance to be induced by the controlled motion of the actuator.

10. The method of claim 7, wherein the actuator is comprised in a data storage device.

11. The method of claim 7, wherein the controlled motion of the actuator comprises a motion for a transducer operatively connected to the actuator to seek a data track in a data storage system.

12. A method comprising:
    predicting a mechanical disturbance to be induced by a controlled motion of an actuator independently of a feedback signal;
    providing a feedforward compensation signal configured to compensate for the mechanical disturbance predicted to be induced by the controlled motion of the actuator; and
    applying the feedforward compensation signal to a signal that controls motion of the actuator.

13. The method of claim 12, further comprising using a filter to predict the predicted mechanical disturbance to be induced by the controlled motion of the actuator.

14. The method of claim 13, wherein the filter is an infinite impulse response filter.

15. An apparatus comprising:
    a servo controller, comprising a position input relating to a position of an actuator and a control signal output for controlling the position of the actuator;
    a compensator, comprising a position input, a feedforward current input, and a modified feedforward current output, wherein the compensator is configured to modify the feedforward current to compensate for a predicted vibration induced by a controlled motion of the actuator, wherein the modified feedforward current output and the control signal output are communicatively connected to provide a combined compensated control signal in communicative connection with a control input for an actuator.

16. The apparatus of claim 15, further comprising instructions for performing a testing mode algorithm and a component configured to execute the testing mode algorithm during a testing mode of operation, wherein a range of natural frequencies and damping ratios of the apparatus are measured and a natural frequency and a damping ratio for reducing power in a position error signal for the actuator are identified, and to apply the identified natural frequency and the identified damping ratio to the modified feedforward current output.

17. An apparatus configured to receive an input feedforward current and modify the input feedforward current to provide a modified feedforward current to a control signal for a servo-controlled mechanism in a data storage system, wherein the modified feedforward current is produced independently of a vibration sensor and is configured to compensate for a previously predicted vibration induced by a controlled motion of the servo-controlled mechanism.

18. The apparatus of claim 17, wherein the apparatus comprises a means to execute an algorithm to predict the vibration induced by the servo-controlled mechanism, wherein the feedforward current is configured to compensate for the vibration as predicted by the algorithm.

19. The apparatus of claim 17, wherein the servo-controlled mechanism comprises an actuator arm with a slider and a transducer disposed thereon.

* * * * *